United States Patent
Takao et al.

(12) 
(10) Patent No.: US 6,497,637 B2
(45) Date of Patent: Dec. 24, 2002

(54) VEHICULAR CONSTANT-SPEED CONTROL APPARATUS AND METHOD OF CONTROLLING VEHICLE SPEED

(75) Inventors: Shirai Takao, Toyota (JP); Nagasaka Masami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/892,356

(22) Filed: Jun. 28, 2001

(65) Prior Publication Data
US 2002/0006850 A1 Jan. 17, 2002

(30) Foreign Application Priority Data
Jul. 12, 2000 (JP) ........................................ 2000-210895

(51) Int. Cl.⁷ .............................................. G60K 41/04
(52) U.S. Cl. ....................................... 477/108; 477/120
(58) Field of Search ................................. 477/108, 120

(56) References Cited

U.S. PATENT DOCUMENTS 5,813,942 A * 9/1998 Nakagawa et al. ......... 477/120
6,141,615 A * 10/2000 Saito et al. .................... 701/51
6,236,929 B1 * 5/2001 Sen et al. ...................... 701/93

FOREIGN PATENT DOCUMENTS

JP 07-172209 11/1995

* cited by examiner

Primary Examiner—Dirk Wright
(74) Attorney, Agent, or Firm—Oblon, Spivak, McClelland, Maier & Neustadt, P.C.

(57) ABSTRACT

If a throttle valve is fully-closed, it is determined whether or not a transmission is to be downshifted, by determining whether or not an acceleration of the vehicle is equal to or greater than a downshift criterion value. The downshift criterion value is set as a value that decreases as the vehicle speed deviation, which is a difference between a vehicle speed and a target vehicle speed, increases. By using a downshift criterion value, an increase in the vehicle speed deviation resulting from a quick downshift on a steep downhill can be restrained. On a gentle downhill, a downshift is not performed even if the vehicle speed deviation assumes a significant value. Thus, it becomes possible to inhibit the vehicle speed from becoming lower than the target vehicle speed during a short period after downshift. Accordingly, an increase in fuel consumption and deterioration of noise of the engine can be restrained.

17 Claims, 3 Drawing Sheets

VEHICULAR CONSTANT-SPEED CONTROL APPARATUS AND METHOD OF CONTROLLING VEHICLE SPEED

INCORPORATION BY REFERENCE

The disclosure of Japanese Patent Application No. 2000-210895 filed on Jul. 12, 2000, including the specification, drawings and abstract is incorporated herein by reference in its entirety.

BACKGROUND OF THE INVENTION

1. Field of the Invention

The invention relates to a vehicular constant-speed control apparatus and a method of controlling vehicle speed and, more particularly, to a vehicular constant-speed control apparatus that controls operation of an internal combustion engine and gear-shift stages of a transmission such that a vehicle runs at a constant speed, i.e., at a target vehicle speed, and to a method of controlling vehicle speed.

2. Description of Related Art

Conventionally, as a vehicular constant-speed control apparatus of this type, there has been proposed one which downshifts a transmission if a vehicle speed deviation representative of a difference between a vehicle speed and a target vehicle speed has become equal to or greater than a predetermined value. One such constant-speed control apparatus is disclosed e.g. in Japanese Patent Application Laid-Open No. 7-172209. In this constant-speed control apparatus, a transmission is downshifted while a vehicle runs at a constant speed. Thus, an increase in vehicle speed is prevented even if an engine is in operation with a full-closed throttle valve while the vehicle runs down a downhill.

However, according to such a vehicular constant-speed control apparatus, even in the case where a downshift causes an immediate decrease in vehicle speed while a vehicle runs down a relatively gentle slope, the downshift is performed if a vehicle speed deviation between a vehicle speed and a target vehicle speed has become equal to or greater than a predetermined value. In this case, the speed of the engine needs to be increased to maintain the vehicle speed after the downshift at the target vehicle speed. This causes problems of an increase in the amount of fuel consumed by the engine and deterioration of engine noise levels.

SUMMARY OF THE INVENTION

The invention has been made as a solution to the above problems. It is an object of a vehicular constant-speed control apparatus and a method of controlling vehicle speed according to the invention to restrain an increase in fuel consumption and deterioration of engine noise level while a vehicle runs at a constant-speed.

A vehicular constant-speed control apparatus according to the invention controls operation of an internal combustion engine and gear-shift stages of a transmission such that a vehicle equipped with the internal combustion engine and the transmission runs at a constant speed, i.e., at a target vehicle speed, and comprises a vehicle speed sensor that detects a vehicle speed, an acceleration sensor that detects an acceleration of the vehicle, and an operation state detector that detects an operation state of the internal combustion engine. The transmission is downshifted if the operation state detector detects that the internal combustion engine is in an operation state of a full-closed throttle valve and if the acceleration detected by the acceleration sensor is equal to or greater than a criterion value. The criterion value is set as a value that decreases as a vehicle speed deviation between the vehicle speed detected by the vehicle speed sensor and the target vehicle speed increases.

In the vehicular constant-speed control apparatus according to the invention, the transmission is controlled to be downshifted if the operation state detector detects that the internal combustion engine is in an operation state of a fully-closed throttle valve and if the acceleration detected by the acceleration sensor is equal to or greater than a criterion value that decreases as the vehicle speed deviation between the vehicle speed detected by the vehicle speed sensor and the target vehicle speed increases. Thus, in the case where the vehicle speed has increased on a steep downhill, the acceleration of the vehicle is great even if the vehicle speed deviation is small. Therefore, a downshift can be performed quickly. In the case where downshift causes an immediate decrease in vehicle speed while the vehicle runs down a relatively gentle slope, a downshift is not performed until the vehicle speed increases to a measurable value. This eliminates the possibility of an unnecessary downshift being performed to prevent the vehicle speed from increasing. That is, it is possible to downshift the transmission more appropriately, prevent an increase in the vehicle speed deviation between the vehicle speed and the target vehicle speed, and restrain an increase in fuel consumption and deterioration of the engine noise level.

BRIEF DESCRIPTION OF THE DRAWINGS

The above and other objects, features, advantages, technical and industrial significance of this invention will be better understood by reading the following detailed description of a preferred embodiment of the invention, when considered in connection with the accompanying drawings, in which.

DETAILED DESCRIPTION OF PREFERRED EMBODIMENT

In the following description and the accompanying drawings, the invention will be described in more detail in terms of a preferred embodiment.

Figure 1:
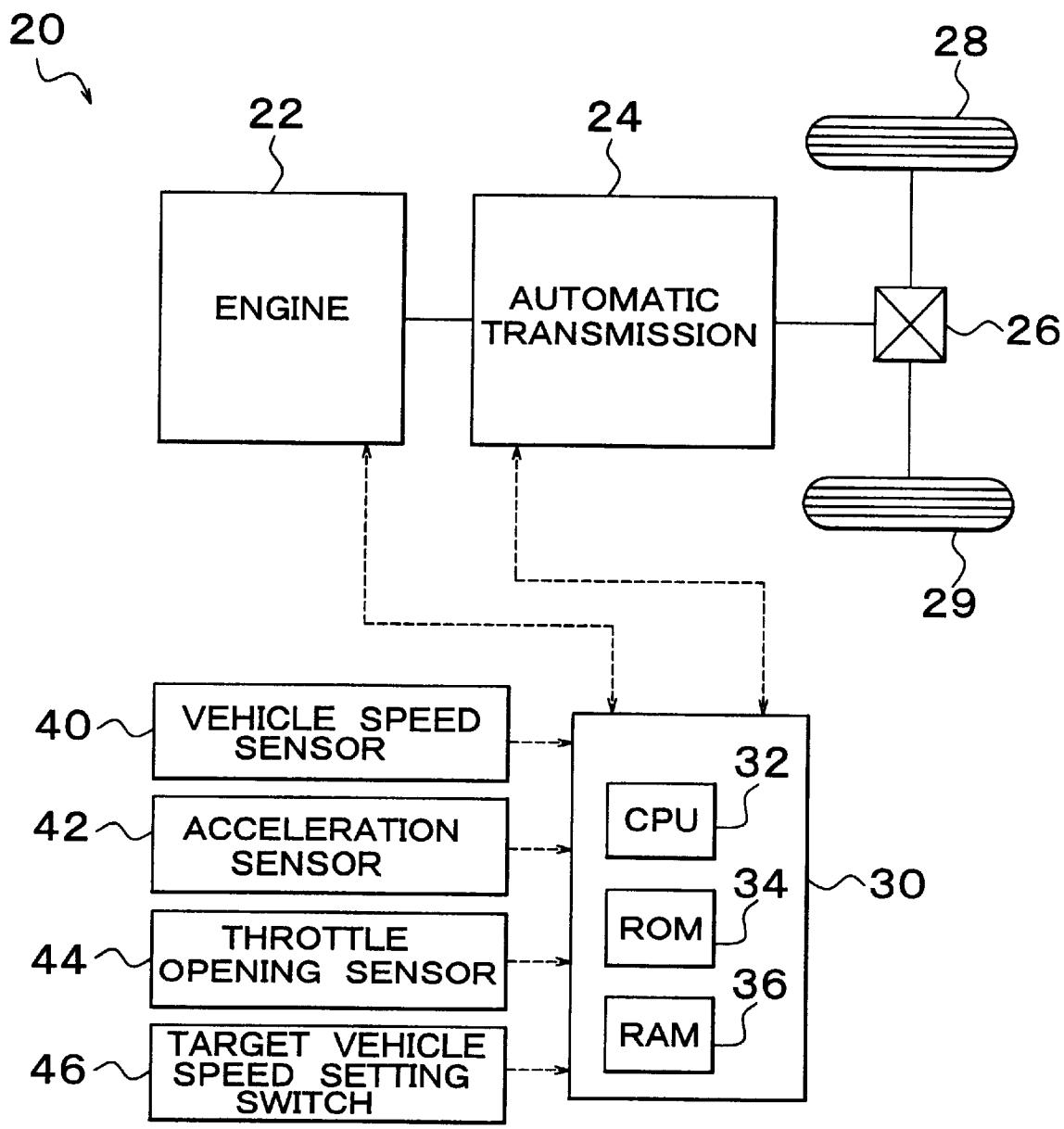
FIG. 1 is a block diagram showing an overall construction of a vehicular constant-speed control apparatus according to an embodiment as one example of the invention.

Hereinafter, an embodiment of the invention will be described. FIG. 1 is a block diagram showing an overall construction of a vehicular constant-speed control apparatus 20 according to a first embodiment as an example of the invention. As shown in FIG. 1, the vehicular constant-speed control apparatus 20 is associated with a gasoline engine 22 as an internal combustion engine and an automatic transmission 24 as a transmission that is mechanically connected to a crank shaft of the engine 22 and that can change the rotational speed of the crank shaft in a plurality of stages, and has an electronic control unit 30 that controls the constant-speed control apparatus 20 as a whole.

Although not shown, the engine 22 is fitted with fuel injection valves, a throttle valve for adjusting amount of intake air, and so on. The electronic control unit 30 adjusts the opening S of the throttle valve and the fuel injection period for the fuel injection valves, whereby output from the engine 22 can be controlled.

The automatic transmission 24 is composed, for example, of a hydrodynamic torque converter and a planetary-gear-type transmission with four forward stages and one reverse stage. The electronic control unit 30 controls a hydraulic circuit, whereby gear-shift stages of the automatic transmission 24 can be controlled. An output shaft of the automatic transmission 24 is connected to driven wheels 28, 29 via a differential gear 26. An output from the engine 22 is finally outputted to the driven wheels 28, 29.

The electronic control unit 30 is constructed as a microprocessor that is mainly composed of a CPU 32, and has a ROM 34 in which processing programs are stored, a RAM 36 in which data are stored temporarily, and an I/O port (not shown). A vehicle speed V from a vehicle speed sensor 40, a vehicle acceleration "a", from an acceleration sensor 42, a throttle opening S from a throttle opening sensor 44, a target vehicle speed V* from a target vehicle speed setting switch 46, and so on are inputted to the electronic control unit 30 via input ports. A drive signal for an actuator (not shown) for the throttle valve in the engine 22, drive signals for the fuel injection valves and so on, and a hydraulic pressure control signal for the automatic transmission 24, and so on are outputted from the electronic control unit 30 via output ports.

Figure 2:
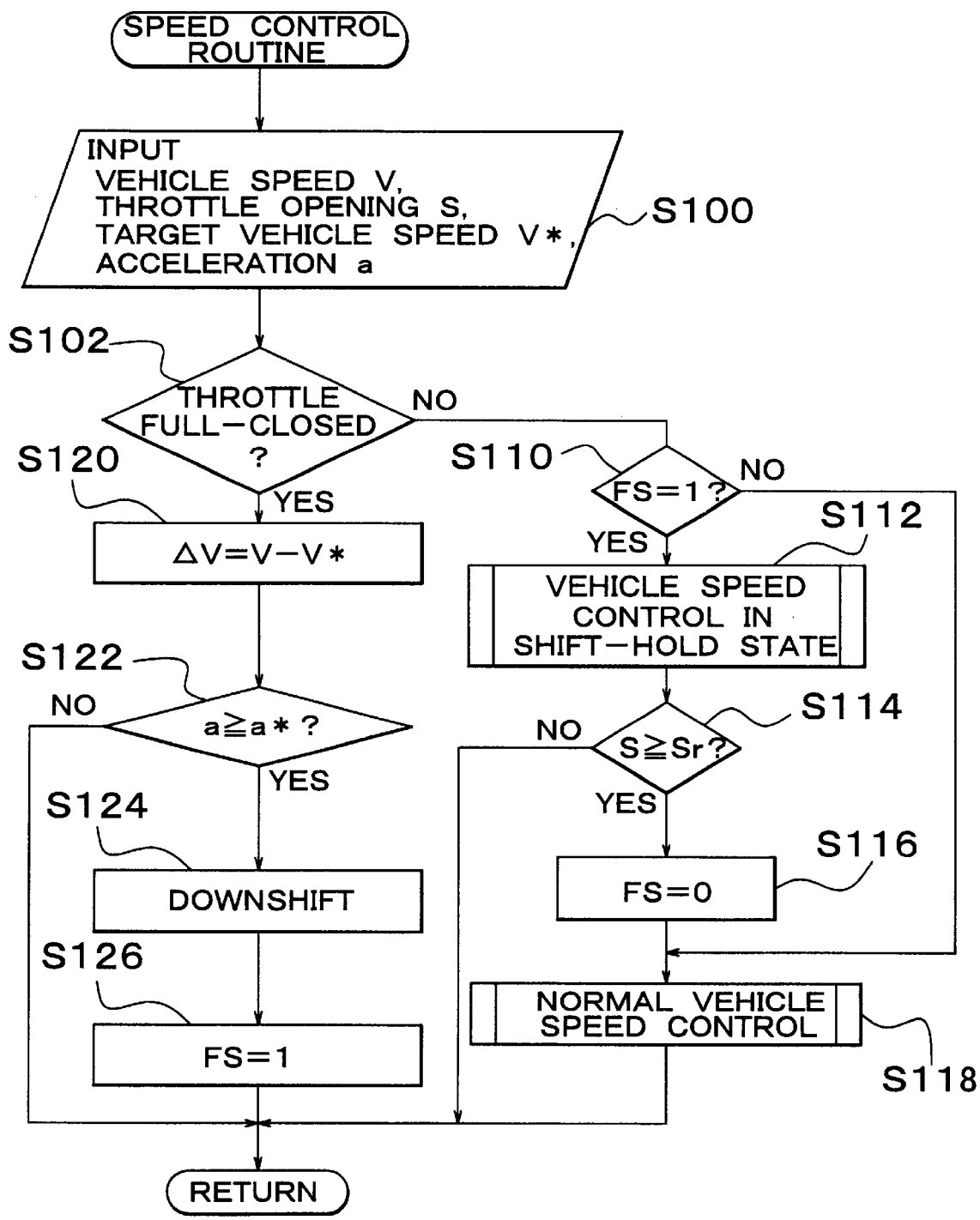
FIG. 2 is a flowchart showing as an example a speed control routine that is executed by an electronic control unit of the vehicular constant-speed control apparatus according to the embodiment.

Next, it will be described how the vehicular constant-speed control apparatus 20 constructed as described above operates, especially on a downhill. FIG. 2 is a flowchart showing, as an example, a speed control routine that is executed by the electronic control unit 30 of the vehicular constant-speed control apparatus 20 according to the embodiment. This routine is repeatedly executed at intervals of a predetermined period after a target vehicle speed V* has been set by the target vehicle speed setting switch 46.

Upon execution of the speed control routine, first of all in step S100, the CPU 32 of the electronic control unit 30 performs processings of reading a vehicle speed V detected by the vehicle speed sensor 40, an acceleration "a", detected by the acceleration sensor 42, a throttle opening S detected by the throttle opening sensor 44, and a target vehicle speed V* detected by the target vehicle speed setting switch 46. The CPU 32 then proceeds to step S102 and determines, from the throttle opening S that has been read, whether or not the throttle valve is fully-closed. If the throttle valve is fully-closed and the vehicle speed V is higher than the target vehicle speed V*,in many cases, this indicates that the vehicle is running on a downhill.

If the throttle valve is not full-closed, the CPU 32 proceeds to step S110 and determines whether or not a downshift determining flag FS assumes a value of 1. If the result in step S110 is NO, the CPU 32 jumps to step S118 and performs normal vehicle speed control for controlling output of the engine 22 and gear-shift stages of the automatic transmission 24 such that the vehicle speed V becomes equal to the target vehicle speed V*. The CPU 32 then proceeds to step S130 and terminates the present routine. Because normal vehicle speed control does not constitute the essence of the invention, a detailed description thereof will be omitted. The downshift determining flag FS will be described later.

If the throttle valve is fully-closed in step S102, the CPU 32 proceeds to step S120 and calculates a vehicle speed deviation ΔV by subtracting the target vehicle speed V* from the vehicle speed V. The CPU 32 then proceeds to step S122 and determines whether or not the vehicle acceleration "a" that has been read is equal to or greater than a downshift criterion value a* that is set based on the calculated vehicle speed deviation ΔV. If the acceleration a is equal to or greater than the downshift criterion value a*, the automatic transmission 24 is downshifted. The CPU 32 then proceeds to step S126, sets the downshift determining flag FS as 1, proceeds to step S130, and terminates the present routine.

Figure 3A:
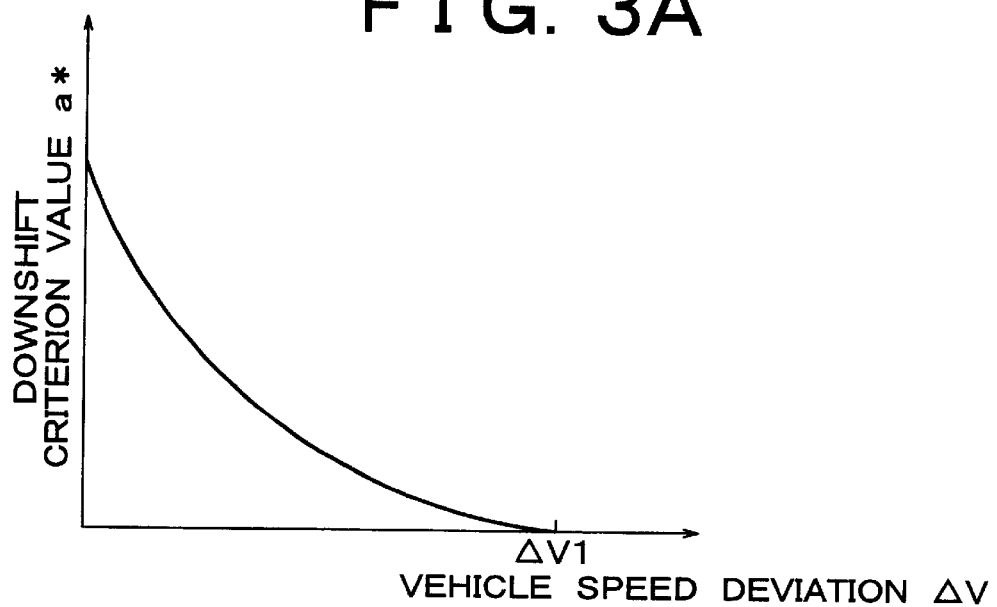
FIG. 3A is an explanatory view showing as an example a relation between vehicle speed deviation and downshift criterion value.

FIG. 3A is an explanatory view showing, as an example, a relation between vehicle speed deviation and downshift criterion value. In this embodiment, as shown in FIG. 3A, the downshift criterion value a* is set so as to decrease as the vehicle speed deviation ΔV increases. That is, the automatic transmission 24 is downshifted when the acceleration "a" is great even if the vehicle speed deviation ΔV is small. On the other hand, even if the acceleration "a" is small, a downshift of the automatic transmission 24 will more readily occur as the vehicle speed deviation ΔV increases. On a steep downhill, the acceleration "a" is great even when the vehicle speed deviation ΔV is small. Thus, by using the downshift criterion value a*, an increase in the vehicle speed deviation ΔV resulting from a quick downshift can be restrained. On the other hand, on a gentle downhill, since the acceleration "a" is small, the automatic transmission 24 is not downshifted even if the vehicle speed deviation ΔV assumes a significant value. This makes it possible to inhibit the vehicle speed V from becoming lower than the target vehicle speed V* during a short period after downshift. If the acceleration "a" is smaller than the downshift criterion value a* in step S122, the CPU 32 determines that there is no need to downshift the automatic transmission 24, skips to step S130, and terminates the present routine.

Figure 3B:
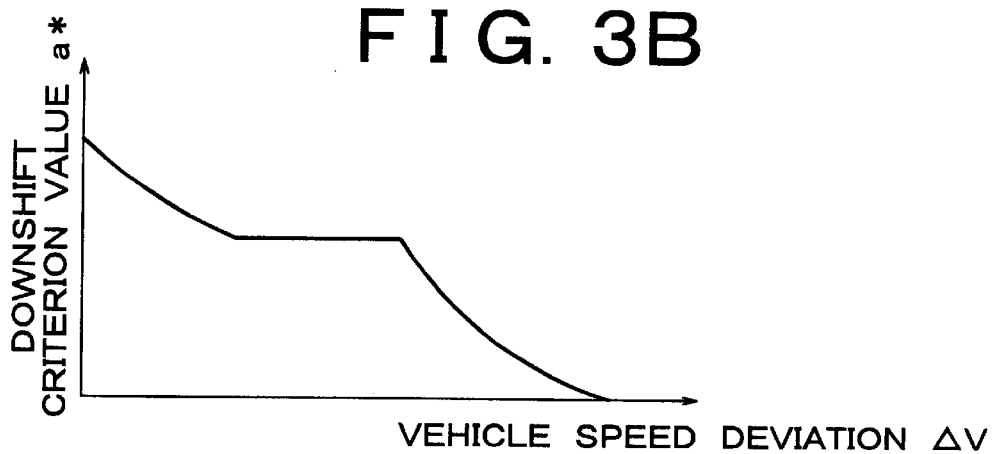
FIG. 3B is an explanatory view showing as another example a relation between vehicle speed deviation and downshift criterion value.
Figure 3C:
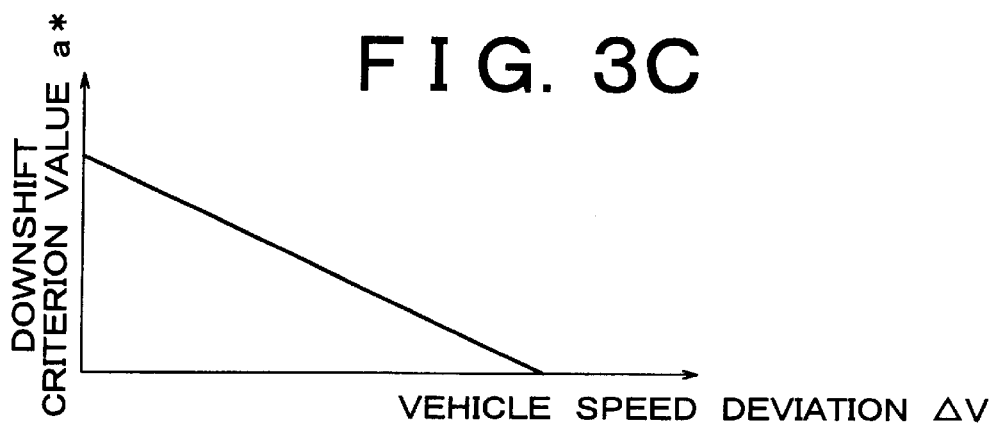
FIG. 3C is an explanatory view showing as still another example a relation between vehicle speed deviation and downshift criterion value.

Note that, in addition to the aforementioned one, there are various other modes of setting the downshift criterion value a* in relation to the vehicle speed deviation ΔV. For example, as shown in FIG. 3B, the downshift criterion value a* may temporarily assume a constant value as the vehicle speed deviation ΔV increases. Furthermore, the downshift criterion value a* may change linearly as shown in FIG. 3C instead of changing along a curve as shown in FIG. 3A.

If the vehicle finishes running down a downhill after it has been determined in step S122 that the acceleration "a" is equal to or greater than the downshift criterion value a* and after the downshift determining flag FS has been set as 1 in step S126, the throttle opening S no longer corresponds to a fully-closed state. Control performed in this state will be described. In this state, it is determined in step S102 that the throttle valve is not fully-closed and in step S110 that the downshift determining flag FS has been set as 1. At this moment, the CPU 32 proceeds to step S112 and performs vehicle speed control in a shift-hold state, i.e., controls output of the engine 22 such that the vehicle speed V becomes equal to the target vehicle speed V* while holding a downshifted state. This is done because frequent alternation between downshift and upshift is to be avoided. The CPU 32 then proceeds to step S114 and compares the throttle opening S with a threshold Sr. Note that the threshold Sr is used to determine whether or not the vehicle has finished running down the downhill. If the throttle opening S is equal to or greater than the threshold Sr, the CPU 32 determines that the vehicle has finished running down the downhill, resets the downshift determining flag FS as 0 in step S116, proceeds to step S118, resumes normal vehicle speed control, and terminates the present routine. Here, in the normal vehicle speed control the CPU 32 does not perform the vehicle speed control in the above-described shift-hold state. On the other hand, if the throttle opening S is smaller than the threshold Sr, the CPU 32 skips from step S114 to step S130 and terminates the present routine, instead of resuming normal vehicle speed control.

According to the thus-constructed vehicular constant-speed control apparatus 20 of this embodiment, downshift is performed using the downshift criterion value a* that is used based on the vehicle speed deviation ΔV representative of a difference between the vehicle speed V and the target vehicle speed V*. Thus, it becomes possible to inhibit the vehicle speed V from greatly exceeding the target vehicle speed V* due to a quick downshift on a steep downhill. On a gentle downhill, a downshift is not performed even if the vehicle speed deviation ΔV assumes a significant value. Accordingly, the vehicle speed V is prevented from becoming lower than the target vehicle speed V* during a short period after downshift. Thus, there is no need to increase the output of the engine 22 to prevent the vehicle speed V from dropping below the target vehicle speed V* and the speed of the engine 22 from rising immediately after downshift because of downshift. Namely, an increase in fuel consumption and deterioration of the noise level of the engine 22 can be restrained.

In the vehicular constant-speed control apparatus 20 of this embodiment, if the automatic transmission 24 has been downshifted when the throttle valve is full-closed, vehicle speed control in a shift-hold state is performed until the throttle opening S becomes equal to or greater than the threshold Sr. However, normal vehicle speed control may be resumed when the throttle valve shifts from its fully-closed state.

In the vehicular constant-speed control apparatus 20 of this embodiment, the acceleration sensor 42 detects an acceleration "a" of the vehicle. However, the acceleration "a" may be detected through calculation based on a vehicle speed V detected by the vehicle speed sensor 40.

The vehicular constant-speed control apparatus 20 of this embodiment is realized as a vehicular constant-speed control apparatus that is installed in a vehicle in which the automatic transmission 24 is connected to the crank shaft of the engine 22. However, the invention is also applicable to a vehicular constant-speed control apparatus that is installed in a vehicle fitted with electric motors that allow power to be inputted to and/or outputted from the output shaft of the automatic transmission 24 and/or the crank shaft of the engine 22.

While the invention has been described with reference to a preferred embodiment thereof, it is to be understood that the invention is not limited to the preferred embodiment or construction. To the contrary, the invention is intended to cover various modifications and equivalent arrangements. In addition, while the various elements of the preferred embodiment are shown in various combinations and configurations, which are exemplary, other combinations and configurations, including more, less or only a single element, are also within the spirit and scope of the invention.

What is claimed is:

1. A vehicular constant-speed control apparatus that controls operation of an internal combustion engine and gear-shift stages of a transmission such that a vehicle equipped with the internal combustion engine and the transmission runs at a constant target vehicle speed, comprising:

a vehicle speed sensor that detects a vehicle speed;
an acceleration sensor that detects an acceleration of the vehicle;
an operation state detector that detects an operation state of the internal combustion engine; and
a gear-shift controller that downshifts the transmission if the operation state detector detects that the internal combustion engine is in an operation state of a fully-closed throttle valve and if the acceleration detected by the acceleration sensor is at least equal to a criterion value, wherein
the criterion value is set as a value that decreases as a vehicle speed deviation between the vehicle speed detected by the vehicle speed sensor and the target vehicle speed increases.

2. The constant-speed control apparatus according to claim 1, wherein
the criterion value remains constant as a vehicle speed deviation between the vehicle speed detected by the vehicle speed sensor and the target vehicle speed increases for a part of the range of the vehicle speed deviation.

3. The constant-speed control apparatus according to claim 1, wherein
an upshift of the transmission is prohibited after the transmission has been downshifted by the gear-shift controller, until the operation state detector detects that the internal combustion engine is in an operation state of a throttle opening that is at least equal to a predetermined value.

4. The constant-speed control apparatus according to claim 3, wherein
normal gear-shift control is resumed in the transmission after the transmission has been downshifted by the gear-shift controller, if the operation state detector detects that the internal combustion engine has assumed an operation state of a throttle opening that is at least equal to a predetermined value.

5. The constant-speed control apparatus according to claim 1, wherein
normal gear-shift control is resumed in the transmission after the transmission has been downshifted by the gear-shift controller, if the operation state detector detects that the internal combustion engine has assumed an operation state of a throttle opening that is at least equal to a predetermined value.

6. The constant-speed control apparatus according to claim 2, wherein
an upshift of the transmission is prohibited after the transmission has been downshifted by the gear-shift controller, until the operation state detector detects that the internal combustion engine is in an operation state of a throttle opening that is at least equal to a predetermined value.

7. The constant-speed control apparatus according to claim 6, wherein
normal gear-shift control is resumed in the transmission after the transmission has been downshifted by the gear-shift controller, if the operation state detector detects that the internal combustion engine has assumed an operation state of a throttle opening that is at least equal to a predetermined value.

8. The constant-speed control apparatus according to claim 2, wherein
normal gear-shift control is resumed in the transmission after the transmission has been downshifted by the gear-shift controller, if the operation state detector detects that the internal combustion engine has assumed an operation state of a throttle opening that is at least equal to a predetermined value.

9. A vehicular constant-speed control apparatus that controls operation of an internal combustion engine and gear-shift stages of a transmission such that a vehicle equipped with the internal combustion engine and the transmission runs at a constant target vehicle speed, comprising:

vehicle speed detection means that detects a vehicle speed;

acceleration detection means that detects an acceleration of the vehicle;

operation state detection means that detects an operation state of the internal combustion engine; and gear-shift control means that downshifts the transmission if the operation state detection means detects that the internal combustion engine is in an operation state of a fully-closed throttle valve and if the acceleration detected by the acceleration detection means is at least equal to a criterion value, wherein the criterion value is set as a value that decreases as a vehicle speed deviation between the vehicle speed detected by the vehicle speed detection means and the target vehicle speed increases.

10. The constant-speed control apparatus according to claim 9, further comprising:

upshift withholding means that, if the transmission has been downshifted by the gear-shift control means, withholds an upshift of the transmission until the operation state detection means detects that the internal combustion engine is in an operation state of a throttle opening that is at least equal to a predetermined value.

11. The constant-speed control apparatus according to claim 10, further comprising:

normal gear-shift control means that, after the transmission has been downshifted by the gear-shift control means, resumes normal gear-shift control in the transmission if the operation state detection means detects that the internal combustion engine has assumed an operation state of a throttle opening that is at least equal to a predetermined value.

12. The constant-speed control apparatus according to claim 9, further comprising:

normal gear-shift control means that, after the transmission has been downshifted by the gear-shift control means, resumes normal gear-shift control in the transmission if the operation state detection means detects that the internal combustion engine has assumed an operation state of a throttle opening that is at least equal to a predetermined value.

13. A method of controlling operation of an internal combustion engine and gear-shift stages of a transmission such that a vehicle equipped with the internal combustion engine and the transmission runs at a constant target vehicle speed, comprising the steps of:

detecting that the internal combustion engine is in an operation state of a fully-closed throttle valve;

detecting a vehicle speed of the vehicle;

calculating a vehicle speed deviation between the vehicle speed and the target vehicle speed;

detecting an acceleration of the vehicle; and performing control such that the transmission is downshifted if the acceleration is at least equal to a criterion value, wherein the criterion value is set as a value that decreases as the vehicle speed deviation increases.

14. The method according to claim 13, wherein the criterion value remains constant as a vehicle speed deviation between the vehicle speed and the target vehicle speed increases for a part of the range of the vehicle speed deviation.

15. The method according to claim 13, wherein an upshift of the transmission is prohibited after the transmission has been downshifted, until the internal combustion engine assumes an operation state of a throttle opening that is at least equal to a predetermined value.

16. The method according to claim 13, wherein normal gear-shift control is resumed in the transmission after the transmission has been downshifted, if the internal combustion engine has assumed an operation state of a throttle opening that is at least equal to a predetermined value.

17. A vehicular constant-speed control apparatus that controls operation of an internal combustion engine and gear-shift stages of a transmission such that a vehicle equipped with the internal combustion engine and the transmission runs at a constant target vehicle speed, comprising a gear-shift controller for downshifting the transmission if the internal combustion engine is in an operation state of a fully-closed throttle valve and an acceleration of the vehicle is at least equal to a criterion value, wherein the criterion value is set as a value that decreases as a vehicle speed deviation between the vehicle speed detected by the vehicle speed sensor and the target vehicle speed increases.

* * * * *

UNITED STATES PATENT AND TRADEMARK OFFICE
CERTIFICATE OF CORRECTION

PATENT NO. : 6,497,637 B2
DATED : December 24, 2002
INVENTOR(S) : Shirai et al.

It is certified that error appears in the above-identified patent and that said Letters Patent is hereby corrected as shown below:

<u>Title page,</u>
Items [12] and [75], should read:

-- [12] United States Patent
Shirai et al. --

-- [75] Inventors: Takao Shirai, Toyota (JP); Masami Nagasaka, Toyota (JP) --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,497,637 B2
DATED         : December 24, 2002
INVENTOR(S)   : Shirai et al.

It is certified that error appears in the above-identified patent and that said Letters Patent is hereby corrected as shown below:

<u>Title page,</u>
Items [12] and [75], should read:

-- [12] United States Patent
       Shirai et al. --

-- [75] Inventors: Takao Shirai, Toyota (JP); Masumi Nagasaka, Toyota (JP) --

This certificate supersedes Certificate of Correction issued May 6, 2003.

Signed and Sealed this

Fifteenth Day of July, 2003

JAMES E. ROGAN
*Director of the United States Patent and Trademark Office*